United States Patent
Surla et al.

(10) Patent No.: US 8,370,589 B1
(45) Date of Patent: Feb. 5, 2013

(54) SYSTEM AND METHOD FOR RE-USE OF WRITEABLE PPIS

(75) Inventors: Rushi Srinivas Surla, Bangalore (IN); Gaurab Paul, Bangalore (IN); Vasantha Prabhu, Bangalore (IN); Ritesh Tiwari, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 494 days.

(21) Appl. No.: 12/257,136

(22) Filed: Oct. 23, 2008

(51) Int. Cl.
*G06F 12/16* (2006.01)

(52) U.S. Cl. ............ 711/162; 711/161; 714/6.2; 714/15; 707/639; 707/649

(58) Field of Classification Search .................. None
See application file for complete search history.

(56) References Cited

U.S. PATENT DOCUMENTS

2005/0182799 A1 *  8/2005  Hitz et al. ................. 707/202
2006/0179261 A1 *  8/2006  Rajan ....................... 711/162

* cited by examiner

*Primary Examiner* — Tuan Thai
*Assistant Examiner* — Alan Otto
(74) *Attorney, Agent, or Firm* — Perkins Coie LLP

(57) ABSTRACT

Techniques introduced herein allow writeable PPIs to be re-used. A writeable PPI manager can make use of existing writeable PPIs to offer logical units to clients without creating additional writeable PPIs. The writeable PPI manager can determine which writeable PPIs to re-use by testing the writeable PPIs for a variety of conditions. Advantageously, re-use of remaining logical units reduces unnecessary replication of data and increased overhead costs. Resources can thereby be conserved.

27 Claims, 8 Drawing Sheets

SYSTEM AND METHOD FOR RE-USE OF WRITEABLE PPIS

BACKGROUND

A storage system can include a computing system or group of computing systems that offer storage services to one or more client computing systems. For example, a network storage controller, which may be a storage server, can be used in a storage area network (SAN) or in a network attached storage (NAS) environment. Either a SAN or NAS environment typically includes one or more mass storage devices for storage of data.

A network storage controller manages data in the mass storage devices. Typically a network storage controller provides requesting client computers with file level access, block level access or both. The mass storage devices can be non-volatile storage such as magnetic or optical disks. Such mass storage devices may be organized into groups of drives, such as into a redundant array of independent disks (RAID). A network storage controller typically includes memory for buffering data to be read from and written to the mass storage system. A network storage controller can implement the buffer as dynamic random access memory (DRAM).

The non-volatile mass storage devices may be aggregated and divided into volumes including logical units. Each logical unit can be identified by a logical unit number (LUN). The volume and all included logical units within the volume can be backed up by creating a persistent point-in-time image (PPI) of volume data.

A PPI is typically created as read-only, however, the PPI can be created as a read-write PPI. Such a read-write PPI can be referred to as a "writeable PPI." One or more clients may access a writeable PPI via a network, such as by mapping to the logical units within the writeable PPI and reading from and writing to the logical units as virtual mass storage devices. Data is stored to and retrieved from the logical units by the clients as though the logical units were locally attached to the clients as mass storage devices.

A client can request a writeable PPI for the purpose of performing an operation on data within the writeable PPI. Such operations can have many purposes, for example, a client could desire to perform tests on data that could not be performed on a volume in use, the client may wish to delete data or modify data, etc.

In response to the request for a writeable PPI, a storage server can create a writeable PPI. Typically, a volume and a writeable PPI created from the volume each include multiple logical units. However, only a subset of the logical units may be needed by the client for the particular purpose for which the writeable PPI was requested. Creation of more than one writeable PPI from the same volume can lead to unnecessary replication of data and increased overhead costs in managing the numerous logical units, many of which are not used. Further, some systems may have a finite number of writeable PPIs that can be managed. In an environment having numerous volumes, creation of many writeable PPIs can exhaust such a finite number.

DETAILED DESCRIPTION

Figure 1:
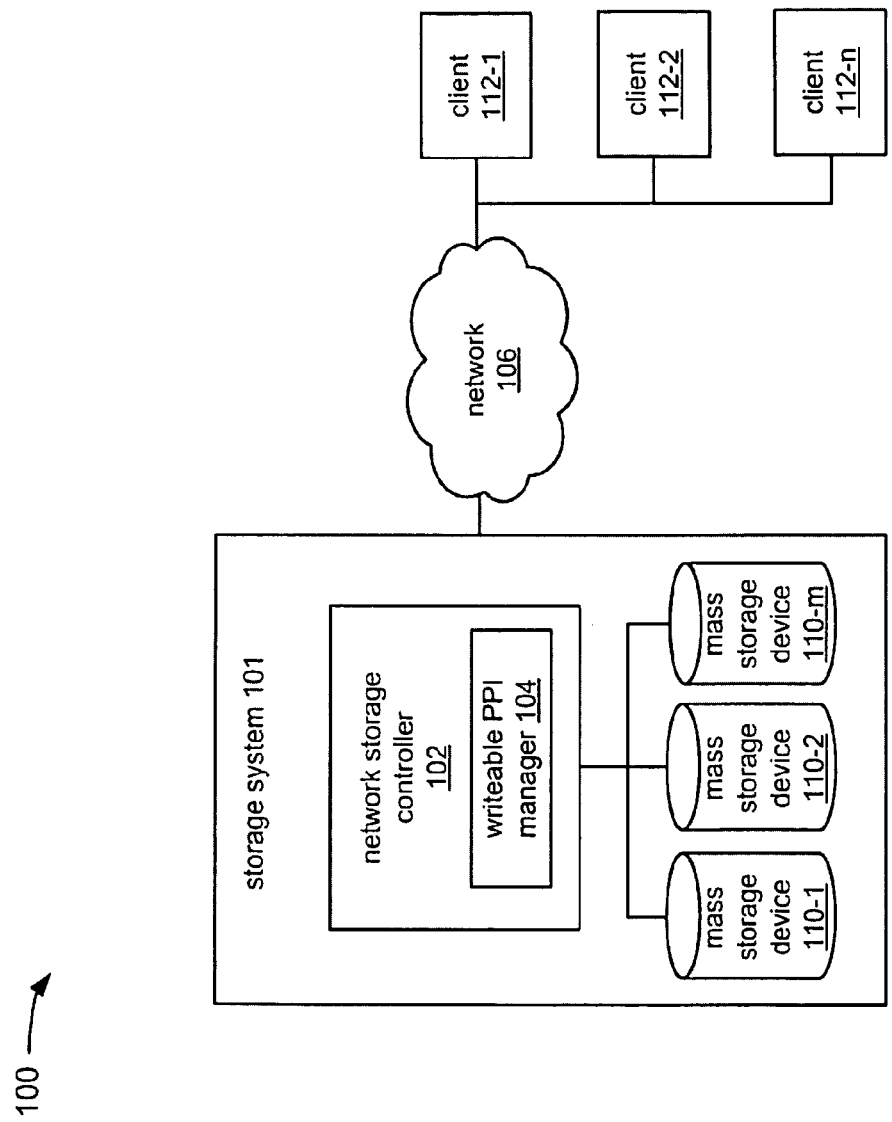
FIG. 1 is a diagram of an example of a system using a writeable PPI manager to re-use a writeable PPI.

At times individual users may desire to have access to data at a specific point in time. As discussed above, a writeable PPI allows a client to perform operations on the data at the existing point in time without impacting the original data. Upon completion of, for example, tests on the original data, the writeable PPI can be disposed of without any impact to the original data. However, as discussed above, the creation of writeable PPIs results in overhead and management of the many writeable PPIs as each logical unit in the writeable PPI is duplicated when the writeable PPI is duplicated. Decreasing the number of writeable PPIs maintained in a storage system can increase the efficiency of computing resources and can increase performance in the system.

Introduced herein, therefore, are techniques for making use of logical units in writeable PPIs. One such concept is the "re-use" of a writeable PPI. As used herein, "re-use" of a writeable PPI means the use of logical units within a previously created writeable PPI, obviating the need to create a new writeable PPI.

The logical units currently needed by the client are typically being used for the first time, however, other logical units in the writeable PPI may have been used for other file systems. Therefore, the "re-use" is of the writeable PPI, but not necessarily the individual logical units being used by the client.

Logical units of a writeable PPI can be re-used to store data for a file system that a client uses to perform operations. As used herein, a "file system" is meant to be an executable process, such as is embodied in software for execution on a computing device, for organizing and managing stored data. A file system can manage "files" as well as basic units of data called "blocks," logical containers, and/or other data units and organizational modules.

Exemplary operations include testing the data for defects or experimentation with programs that require a data set. As used herein, a "data set" is an arrangement of data pertaining to a project, problem or other common factor. As used herein, a live data set is a data set as defined above that is regularly changed by a client or clients. Some client operations may require a live data set; however, for other operations can irreparably change the data set, negatively impacting the data set. Rather than allowing the operations to proceed on the live data set, the operations could be performed using a file system built on the logical units of a writeable PPI. In doing so, any changes would not affect the live data set, as the changes would be confined to the writeable PPI(s).

Typically, logical units within writeable PPIs will be reusable, however, not every writeable PPI will meet the criteria for re-use. Further, some of the logical units may meet the requirements of a client or process requiring the logical units while others may not. In order to determine whether a writeable PPI can be re-used, the writeable PPI can be tested to determine the possibility of re-use. Exemplary tests that can be performed on a writeable PPI include testing for use of the logical units by other clients, testing for modification of the logical units after the creation of the writeable PPI, testing for reservation settings indicating storage requirements that may or may not meet the client's needs, and other tests.

Regarding the test for use, typically, a writeable PPI can include one or more logical units that are in use and a number of logical units that are not in use. The logical units can be tested by for use by clients other than the client requesting the writeable PPI to determine whether or not other clients are already using the logical units. If the logical units are in use, other clients may be reading and writing data to the logical units. Such a condition can be undesirable for a client desiring to re-use the logical units as the data included in the logical units may change, the multiple clients may write data at the same time, or other problems may occur. Thus, current use by another client can preclude re-use by a client. Therefore, the logical units are tested for use. The test of use is discussed in further detail in reference to FIG. 7.

Another example of a test that can be performed on logical units is a test of reservation settings. When a client requests one or more logical units included in a writeable PPI, the client can specify reservation settings. "Reservation settings" are requirements on a logical unit or writeable PPI that an amount of storage space that can be used as an upper bound by the logical unit or PPI. The reservation settings can be used to ensure that the reserved amount of storage is available for the writeable PPI when requested. Tests of reservation settings are discussed in detail in reference to FIG. 6.

Where tests are passed, a writeable PPI manager can make use of an existing writeable PPI for the logical units included in the writeable PPI. The use of the logical units can be by a file system created by or for the client for the purpose of using the logical units included in the writeable PPI without creating an additional writeable PPI. Advantageously, re-use of the remaining logical units in this manner at least somewhat obviates the replication of writeable PPIs. Further, the overall number of writeable PPIs required by a network storage server is reduced through the re-use of existing writeable PPIs. Performance of storage servers is increased through decreasing the load of writeable PPIs. Overhead associated with the many writeable PPIs is decreased. Risks of overloading a storage system are decreased while decreasing the use of computing resources. In accordance with these advantages, the following systems and methods enable re-use of logical units of existing writeable PPIs for clients requesting writeable PPIs.

FIG. 1 is a diagram of an example of a system using a writeable PPI manager to re-use a writeable PPI. FIG. 1 includes storage system 101, network 106 and clients 112-1 through 112-n. Storage system 101 includes network storage controller 102 and mass storage devices 110-1 through 110-m. Network storage controller 102 includes writeable PPI manager 104.

In the example of FIG. 1, storage system 101 implements functions associated with storage and retrieval of data on behalf of one or more of the clients 112 and can implement one or more network storage protocols, such as iSCSI (internet/initiator SCSI (small computer system interface)), FCP (Fibre Channel Protocol), NFS (Network File System), SMB/CIFS (Server Message Block/Common Internet File System), hypertext transfer protocol (HTTP), transmission control protocol/internet protocol (TCP/IP), or any known or convenient protocol. For example, the storage system 101 can transmit and receive data over a SAN Fabric that can be implemented by the use of hardware supporting protocols in the nature of FCP, iSCSI, or another convenient protocol.

In the example of FIG. 1, the network storage controller 102 includes a storage operating system that includes a storage manager to logically organize data and to control storage access operations. The storage manager can implement a hierarchical structure of directories and files on one or more logical units. Data stored by the network storage controller 102 can be stored in blocks. Files can be defined from multiple blocks, as can larger units of storage, such as volumes.

In the example of FIG. 1, writeable PPI manager 104 controls access to writeable PPIs. The writeable PPI manager 104 includes a plurality of modules discussed in further depth in reference to FIG. 5. The writeable PPI manager 104 can be included in the network storage controller 102 or can be a separate unit coupled to the network storage controller 102. Further, in some cases, the writeable PPI manager 104 could be located on other computing devices. For example, the writeable PPI manager 104 could be located on one or all of the clients 112, a management station (not shown), or another convenient computing device.

In the example of FIG. 1, network 106 can be, for example, a local area network (LAN), wide area network (WAN), metropolitan area network (MAN), global area network such as the Internet, a Fibre Channel fabric, any combination of such networks, or any other known or convenient medium for communicating data. The network 106 can include one or more routers, switches and/or other networking hardware elements coupled together to provide communications to systems or within systems and devices coupled to the network 106.

In the example of FIG. 1, mass storage devices 110-1 through 110-m can be, for example, hard disk drives, such as magnetic hard disks, optical disks, or another form of storage for persistently storing large amounts of data.

In the example of FIG. 1, clients 112-1 through 112-n can be individual personal computers, server class computing devices, or any known or convenient computing systems operable to store data over a network on a network storage controller. The clients 112 can store and retrieve data using network storage protocols, such as iSCSI, FCP, NFS, SMB/CIFS, HTTP, TCP/IP, or any known or convenient protocol.

In the example of FIG. 1, in operation, the client 112-1 has one or more file systems. The client can choose a file system to create a duplicate file system for operation on data, for example, testing the data without damaging the data. The file system can be based on one or more logical units of one or more volumes managed by the storage system 101. The client 112-1, having a need for a duplicative file system, e.g. testing data on the file system without damaging the data, creates a duplicate of the existing file system. The client in doing so sends a request to the storage system 101 for one or more writeable PPIs for the one or more logical units included in the storage system 101.

The storage system 101 can optionally create a writeable PPI or re-use existing writeable PPIs in response to the request. In the example of FIG. 1, it is presumed that at least one writeable PPI can be reused for one or more logical units. To identify the writeable PPI(s) needed, the network storage controller 102 can translate a request for the file system into one or more underlying logical units included in one or more writeable PPIs.

The one or more writeable PPIs can then be tested to determine whether or not the writeable PPIs can be re-used for the file system as requested by the client 112-1. Should the needed writeable PPI(s) be unavailable or should the writeable PPI(s) fail the tests, additional writeable PPI(s) can be created to satisfy the needs of client 112-1.

To determine whether the writeable PPI can be re-used, the tests are performed on either the writeable PPI, or one or more logical units within the writeable PPI. For example, the writeable PPI can be tested to verify the writeable PPI is derived from the volume on which the client's data is stored. A logical unit can be inspected to determine that reservation settings are not exceeded. Another test can determine that the logical units included in the writeable PPI that are needed by the client are not in use by other clients.

Once sufficient writeable PPI(s) have been identified or created the writeable PPIs can be prepared for use with the file system. The file system can then be used by the client 112-1.

Figure 2:
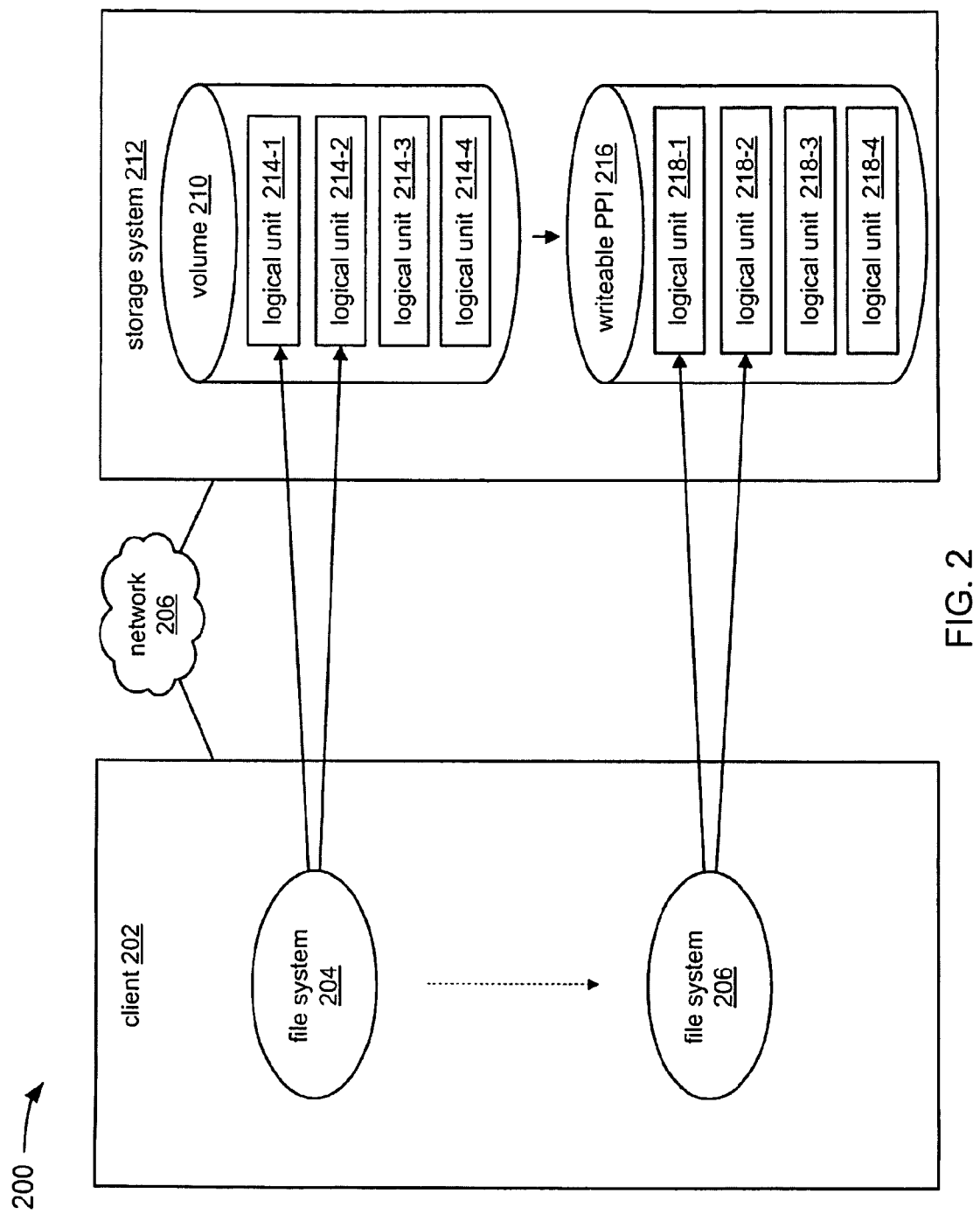
FIG. 2 is a diagram of an example of a file system using logical units within a volume and a file system copy using logical units of a writeable PPI of the volume.

FIG. 2 is a diagram of an example of a file system using logical units within a volume and a file system copy using logical units of a writeable PPI of the volume. FIG. 2 includes client 202, network 206, and storage system 212. Client 202 includes file system 204 and file system 206. Storage system 212 includes volume 210 and writeable PPI 216. Volume 210 includes logical units 214-1 through 214-4. Writeable PPI 216 includes logical units 218-1 through 218-4. Although four logical units are depicted, fewer than four logical units, or more than four logical units could be included in each of the volume 210 and the writeable PPI 216.

In the example of FIG. 2, the file system 204 and the file system 206 can be file systems for using data storage managed by the storage system 212. The volume 210 can be a logical division of storage within the storage system 212. In the example of FIG. 2, the logical units 214 can be divisions of the volume 210. The writeable PPI 216 can be created from a PPI of the volume 210. In the example of FIG. 2, the logical units 218 can be divisions of the writeable PPI 216.

In the example of FIG. 2, the client desires to duplicate the file system 204 as the file system 206 using writeable PPIs so that the client 202 can perform one or more operations on the data included in the volume 210 without damaging the data. The tests can be performed on the data via the file system 204.

In the example of FIG. 2, the duplication of the file system 204 involves evaluation of the logical units storing data for the file system 204. Here, the file system 204 is based on two different logical units in the same volume, logical unit 214-1 and 214-2. Similarly, file system 206 is based on logical unit 218-1 and logical unit 218-2. Duplication of the file system 204 involves use of the writeable PPI 216 as the writeable PPI 216 is based on the volume 210. Specifically, the logical units 218-1 and 218-2 are needed. Alternatively, the file system 206 could use a different writeable PPI (not shown) created from the volume 210 to supply the logical units needed by the file system 206.

Notably, the file system 206 is based on the volume 210 underlying the file system 204. In one embodiment, the duplication of the data in the volume 210 can be avoided as block references associated with the logical unit 214-1 can be used to point to block in the logical units 218 for the purpose of reads. Where writes are needed, duplication can be performed or the changed data can be written to blocks associated with the logical units 218. Specifically, changed data for the file system 206 can be written to blocks other than the blocks used by the logical units 214, however, the existing data stored by the logical units 214 can be read without duplication. The resulting system can be very efficient and can use the file system 206 to perform tests that could not otherwise be performed on the file system 204.

In duplicating the file system, the writeable PPI 216 exists, and the logical units 218-1 and 218-2 are needed for the file system 206 as described above. The logical units 218-1 and 218-2 are tested to determine that the writeable PPI 216 can be used to support the file system 206. The tests are discussed in further detail in regard to FIG. 6 and FIG. 7. Once the tests have been passed, the logical units 218-1 and 218-2 can be used by the client for the file system 206. The client 202 can then perform operations on the data through the file system 206.

Figure 3:
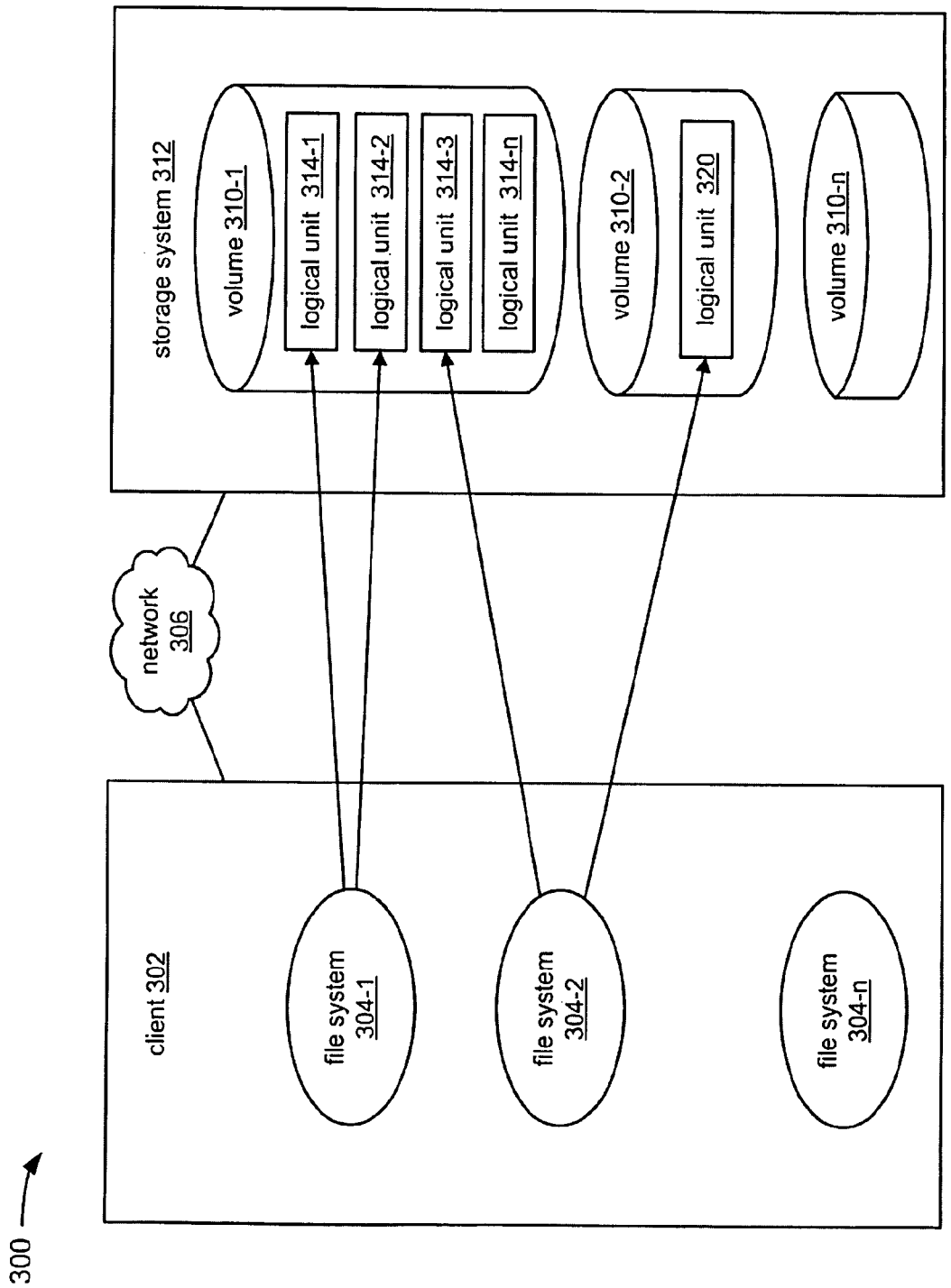
FIG. 3 is a diagram of an example including a file system using logical units on the same volume and a file system using logical units on more than one volume.

FIG. 3 is a diagram of an example including a file system using logical units on the same volume and a file system using logical units on more than one volume. FIG. 3 includes client 302, network 306, and storage system 312. Client 302 includes file systems 304-1 through 304-*n*. Storage system 312 includes volumes 310-1 through volumes 310-*n*. Volume 310-1 includes logical units 314-1 through 314-*n*. Volume 310-2 includes logical unit 320.

The file system 304-2 is notable because it is based on logical units in two different volumes. The file system 304-2 is based on the logical unit 314-3 and the logical unit 320. At times a client may wish to duplicate such a file system using writeable PPIs in order to perform operations on data. Creation of a file system to perform operations on data using writeable PPIs can be done by extending the method discussed in reference to FIG. 2 as described now in detail in regard to FIG. 4.

Figure 4:
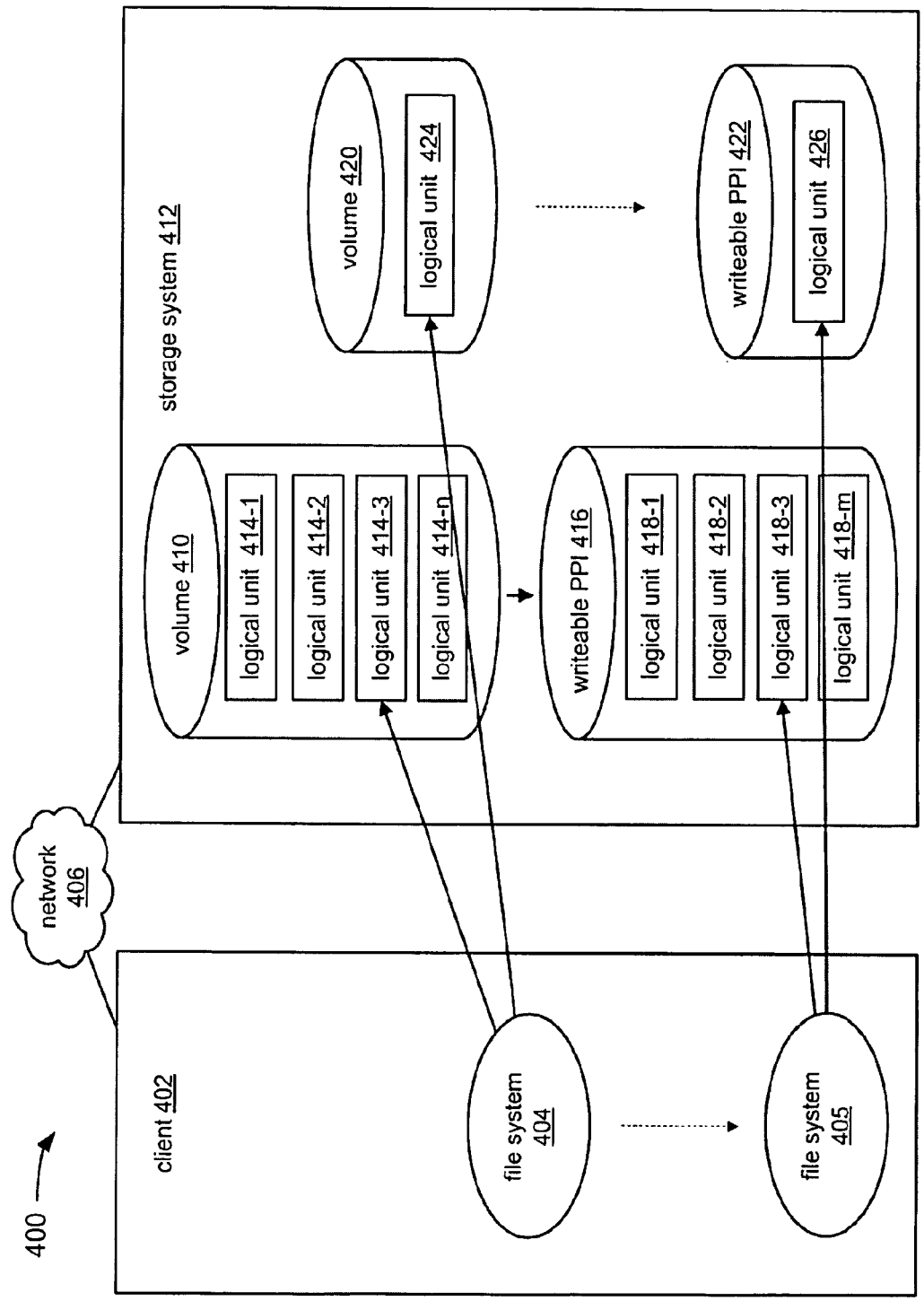
FIG. 4 is a diagram of an example of a file system using writeable PPIs of more than one volume where the file system relies on logical units residing on more than one volume.

FIG. 4 is a diagram of an example of a file system using writeable PPIs of more than one volume where the file system relies on logical units residing on more than one volume. FIG. 4 includes client 402, network 406, and storage system 412. Client 402 includes file system 404 and file system 405. Storage system 412 includes volume 410, volume 420, writeable PPI 416, and writeable PPI 422. Volume 410 includes logical units 414-1 through 414-*n*. Volume 420 includes logical unit 424. Writeable PPI 422 includes logical unit 424.

In the example of FIG. 4, the writeable PPIs 416 and 422 are based on PPIs of volume 410 and volume 420, respectively. The file system 404 uses logical unit 414-3 and logical unit 424, which derive from volume 410 and volume 420, respectively. File system 405 uses logical units from each of writeable PPI 416 and writeable PPI 422. Absent either writeable PPI 416, or 422, file system 405 could not be created using solely writeable PPIs. Should file system 405 be replicated by using writeable PPIs, both writeable PPI 416 and writeable PPI 422, would be needed.

A client wishing to duplicate the file system 404 for operations on the data stored by the volumes 410 and 420 would create the file system 405 which is based on the writeable PPIs 416 and 422. The writeable PPIs 416 and 422 include the logical units 418-3 and 426 respectively. The logical units 418-3 and 426 can each be tested to ensure that the writeable PPIs and the logical units 418-3 and 426 can be used using the methods discussed in FIG. 5 or FIG. 6.

Figure 5:
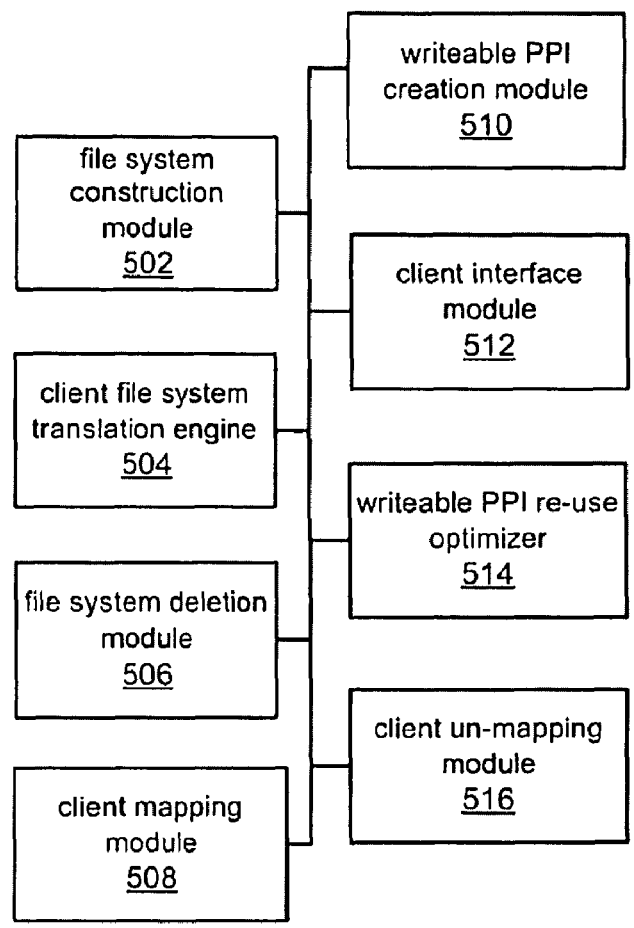
FIG. 5 is a high-level block diagram showing modules of a writeable PPI manager.

FIG. 5 is a high-level block diagram showing modules of a writeable PPI manager 500. The writable PPI manager 500 can be representative of a writeable PPI manager 104 in FIG. 1. The PPI manager 500 includes file system construction module 502, client file system translation engine 504, files system deletion module 506, client mapping module 508, writeable PPI creation module 510, client interface module 512, writeable PPI re-use optimizer 514, and client un-mapping module 518. The modules disclosed herein can be implemented as software modules, specially purposed hardware, firmware or any combination thereof.

In the example of FIG. 5, the file system construction module 502 prepares one or more logical units in one or more writeable PPIs for use by a client. In preparing the logical units, the file system construction module 502 can create a file system operable to interpret one or more logical units as a single virtual storage device. For example, two logical units from different writeable PPIs could be used together to create a file system for read/write access by a client as shown in FIG. 3 and FIG. 4. Further, multiple volumes from the same or different writeable PPIs could be prepared.

In the example of FIG. 5 the client file system translation engine 504 can identify one or more logical units and one or more writeable PPIs underlying the file system from a request for a file system. The file system maps a virtual storage device to the logical units and therefore the writeable PPIs in which the logical units are included. A client reading and writing data using the virtual storage device actually reads and writes data to the logical units. The translation engine 504 can read identifiers of the logical units and the writeable PPIs from the file system.

In the example of FIG. 5 the file system deletion module 506 can be used to restore resources no longer needed from a previously used file system. For example, once a client has completed a project with a file system and no longer needs access to the file system, the resources used by the file system can be reclaimed for other use.

In the example of FIG. 5 the client mapping module 508 can associate a client, such as a client 112 discussed in reference to FIG. 1, with logical units supporting a file system for the client. The logical units and the writeable PPIs can be managed by a storage system, such as storage system 101 discussed in reference to FIG. 1. For example, the client mapping module 508 can establish a connection between the client and the storage system using a SAN Fabric protocol, e.g., iSCSI, FCP, or another convenient protocol.

In the example of FIG. 5 the writeable PPI creation module 510 is operable to duplicate a PPI. Typically, using the copy on write technology of the write anywhere file layout (WAFL), the duplication of a writeable PPI need not copy all of the data from an original writeable PPI to a duplicate writeable PPI. Instead, a duplicate writeable PPI can include pointers that are directed to the blocks of the original writeable PPI. When data is read, it is read from the same blocks as the original writeable PPI. However, when data is changed within the duplicate writeable PPI, the data is written to new blocks. Pointers of the duplicate writeable PPI are then re-pointed to the new blocks. For new data, additional pointers of the writeable PPI can be directed new blocks storing the new data. The writeable PPI creation module 510 can create writeable PPIs and pointers within writeable PPIs as well as direct the pointers to blocks managed by a storage system.

In the example of FIG. 5 the client interface module 512 can receive instructions for the writeable PPI manager through a command interface receiving input from an administrative client or process. For example, if a client would like the writeable PPI manager to create a writeable PPI having certain characteristics, the client or process could enter such requirements in a command via a command line instructing the writeable PPI manager.

In the example of FIG. 5 the writeable PPI re-use optimizer 514 can verify that the one or more writeable PPIs can be re-used by inspecting the writeable PPIs by testing the writeable PPIs prior to re-using them. The detailed explanation of the tests is given in reference to FIG. 6 and FIG. 7.

In the example of FIG. 5 the client un-mapping module 516 is operable to terminate a connection between a client and a storage system. Termination of a connection can be accomplished by ceasing communications in accordance with a SAN protocol, for example, iSCSI, FCP, or another protocol. For example, upon completion of a task where the connection is no longer needed, the client can be unmapped from the storage system.

Figure 6:
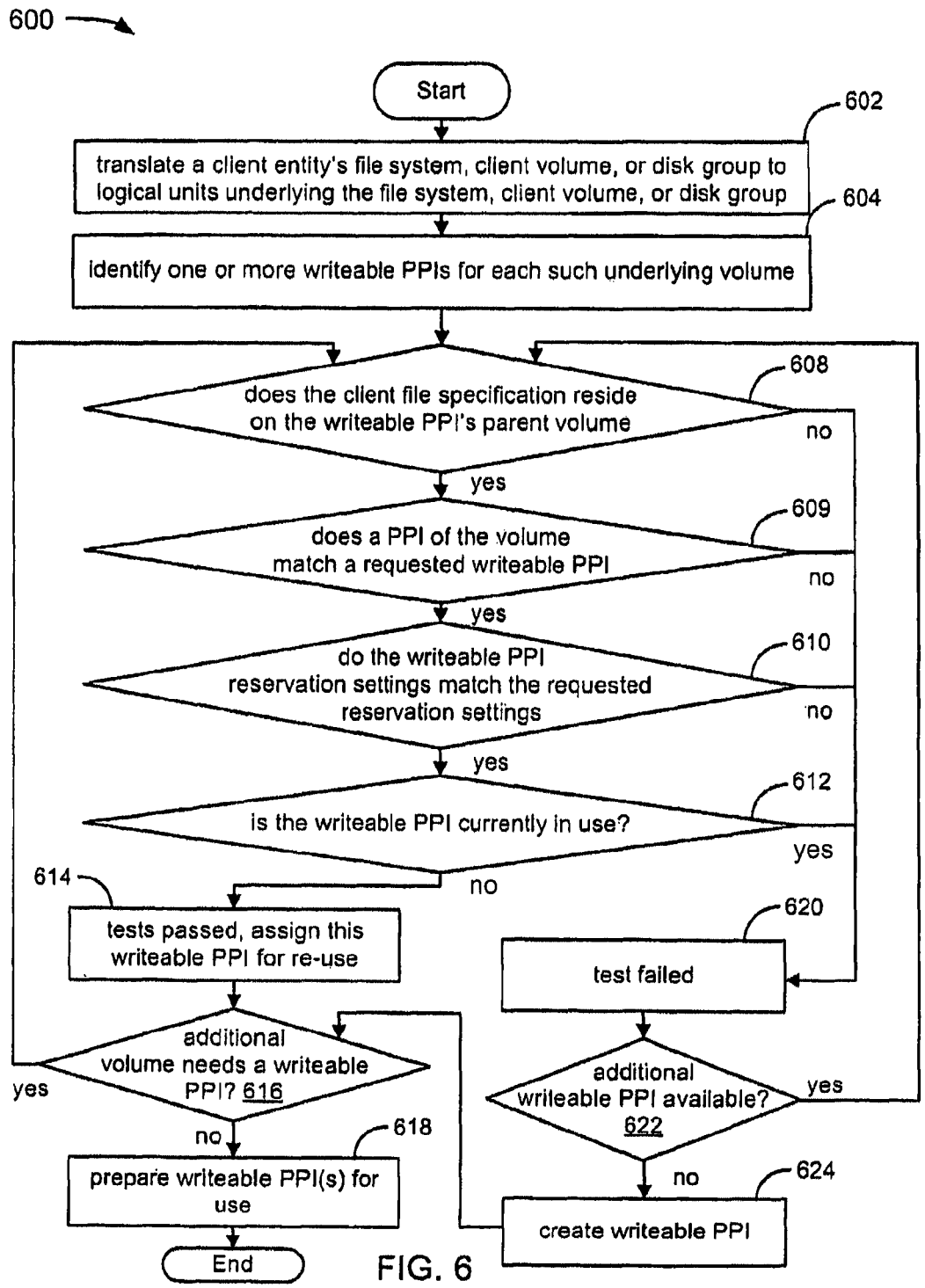
FIG. 6 is a flowchart of a process for analyzing one or more writeable PPIs for re-use.

FIG. 6 is a flowchart of a process 600 for analyzing one or more writeable PPIs as set forth in FIG. 6 for re-use (i.e. to determine whether they meet the criteria for re-use). An automated routine or a client can trigger the process by indicating that a network storage controller should re-use a writeable PPI. For example, a client can transmit a request to the network storage controller for the file system and the network storage controller can interpret the request to re-use logical units of one or more writeable PPIs. Modules discussed in FIG. 5 may be implicated for various functions as described below.

In the example of FIG. 6, the process starts at module 602 with translating a client entity's file system, client volume, or disk group to logical units underlying the file system, client volume, or disk group. A client file system translation engine 504, such as is discussed in reference to FIG. 5 can be used to identify the logical units and writeable PPIs specified by the file system. The purpose of the translation is to find the volumes and the logical units within the volumes needed for the file system. Writeable PPIs based on the volumes can then be used for their logical units. The translation can produce one or more logical units located in one or more volumes. Mappings stored by the client or the storage system can describe the relationship of the file system to the underlying logical units storing the data. The one or more volumes can have one or more writeable PPIs available for re-use, which can be identified in the following module.

In the example of FIG. 6, the process continues to module 604 with identifying one or more writeable PPIs for each such underlying volume. The writeable PPI re-use optimizer 514 as discussed in reference to FIG. 5 can be used for this purpose. As a volume can have more than one existing PPI, the writeable PPI re-use optimizer 514 can create multiple writeable PPIs from the one or more existing PPIs. A client file system translation engine, such as the one discussed in reference to FIG. 5, can perform the translation to identify the writeable PPIs.

In the example of FIG. 6, the flowchart continues with testing the underlying writeable PPI for the first volume as follows:

In the example of FIG. 6, the process continues to decision module 608 with deciding: whether or not the client file specification resides on the writeable PPI's parent volume. As used herein a "parent volume" is a logical volume from which a PPI is directly or indirectly derived. "Indirect" means that the parent volume can be a logical volume, and the PPI is derived from a PPI derived from the parent volume. A writeable PPI re-use optimizer, such as the writeable PPI re-use optimizer 514 can perform the examination. At module 602 more than one writeable PPI can be identified, some of which may not be derived from the correct volume or PPI. At module 608, a goal of the writeable PPI re-use optimizer can be to identify a writeable PPI that is derived from the correct volume or PPI. The writeable PPI re-use optimizer can attempt to retrieve the host specification from the volume or PPI. If the specification does not reside on the volume or PPI, then the writeable PPI is not sourced from the volume and the test fails. Such a failure can indicate that the wrong writeable PPI has been selected. The test can fail, for example, where an erroneous writeable PPI is listed.

In the example of FIG. 6, if the decision at module 608 is no then the process proceeds to module 620, test failed.

In the example of FIG. 6, if the decision at module 608 is yes, then the process proceeds to module 609 with deciding whether a PPI of the volume matches a requested writeable PPI. A client or process can specify a PPI desired for the writeable PPI for re-use. Typically, PPIs have identifiers; in selecting the PPI, the client or process can specify the PPI identifier. The decision can be made depending on whether or not the writeable PPI is associated with a PPI that was specified by the client or process.

In the example of FIG. 6, if the decision at module 609 is no then the process proceeds to module 620, (test failed).

In the example of FIG. 6, if the decision at module 609 is yes, then the process proceeds to module 610 with deciding: whether the writeable PPI's reservation settings match the reservation settings requested by a user or process desiring the writeable PPI. A writeable PPI re-use optimizer 514, as discussed in reference to FIG. 5, can read the reservation settings from the writeable PPI and compare them with the requested reservation settings. If the reservation settings meet or exceed the requested reservation settings then the test is passed. A client or process can specify a reservation setting, e.g. an amount of storage space reserved for the PPI or the logical unit. Reservation settings can be specified to either the logical unit level or the writeable PPI level. For example, where the writeable PPI reservation settings are specified at 2 GB, the amount of data that can be written to the writeable PPI, is limited to 2 GB for all logical units included in the writeable PPI meaning that the individual logical units in sum cannot exceed the reservation settings. However, if reservation settings are specified at the logical unit level, then data cannot be written to exceed the amount of space reserved. If the reservation settings are insufficient for the client's needs, for example, the client requires 2 GB, but the reservation settings are set to 1 GB, then the writeable PPI fails the test. By testing the logical units for use, the writeable PPI is ensured to have sufficient space for the client to perform tasks on the writeable PPI.

In the example of FIG. 6, if the decision at module 610 is no then the process proceeds to module 620, test failed.

In the example of FIG. 6, if the decision at module 610 is yes, then the process proceeds to module 612 with deciding whether or not the writeable PPI is in use. The writeable PPI re-use optimizer 514, as discussed in reference to FIG. 5 can make the decision by inspecting the client mappings, or records of the use of logical units by various clients. The logical units belonging to the client file system could have been modified after creation of the writable PPI. Such logical units may not be currently mapped to any client. To determine whether or not any such logical unit exists in the writable PPI, each logical unit modification time can be compared against the writable PPI creation time.

In inspecting the client mappings, consider that the client mappings can be stored by a client to indicate the logical units that the client accesses when reading and writing data. A storage server managing the data can store the mappings as well. If clients are currently mapped to the logical unit(s) that are needed for re-use, then the logical unit(s) are already in use. However, if clients are not mapped to the logical unit(s), then the logical units are available for use. Notably, the presence of client mappings to un-needed logical unit(s) within a writeable PPI does not preclude the use of other logical units within the writeable PPI; clients can be mapped to one or more of the logical units in the writeable PPI that are not needed for re-use while leaving the remaining logical units available for use.

In the example of FIG. 6, if the decision at module 612 is yes then the process proceeds to module 620, test failed.

In the example of FIG. 6, if the decision at module 612 is no, then the process proceeds to module 614 in which the tests are deemed passed and this writeable PPI is assigned for re-use.

In the example of FIG. 6, the process continues to decision module 616 with deciding whether or not there an additional volume that requires a writeable PPI. An additional writeable PPI can be required where a logical unit resides on a volume that does not have a writeable PPI selected for re-use. For example, suppose a file system requires two logical units, each on separate volumes. Where the process 600 has not acquired a writeable PPI for each volume, one or more writeable PPIs are needed for the remaining volumes. In the example of FIG. 6, if the decision at module 616 is yes, then the process loops back to module 608 to test the next writeable PPI.

In the example of FIG. 6, from module 620, test failed, the process proceeds to decision module 622 with deciding whether or not an additional writeable PPI available. Where multiple PPIs of a volume are available, the multiple volumes can be iterated through so as to test each of them until one is found that passes all of the tests. If all writeable PPIs have been tested, then the decision module 622 finds the answer to be "no," otherwise, the answer is found to be "yes."

If the decision at module 622 is yes, then the process loops to module 608 to begin testing of the additional writeable PPI.

If the decision at module 622 is no, then the process proceeds to module 624 with creating a writeable PPI. The writeable PPI can be created from a PPI of the parent volume. A writeable PPI creation module 510, such as one discussed in reference to FIG. 5 can be used to create the writeable PPI. Creation of the writeable PPI can be accomplished by defining a new, writeable PPI and directing pointers of the new writeable PPI to blocks storing data for the parent volume.

In the example of FIG. 6, if the decision at module 616 is no, then the process proceeds to module 618, with preparing the writeable PPI(s) for use. A client mapping module 508, such as one discussed in reference to FIG. 5 can work in conjunction with a file system construction module 502, such as is also discussed in reference to FIG. 5, to prepare a file system using the writeable PPI(s) to store data for a client. The file system can map the client to logical units within the writeable PPI for use by the client as a virtual storage device.

In the example of FIG. 6, from module 618, the process terminates, having prepared the writeable PPIs for use.

Figure 7:
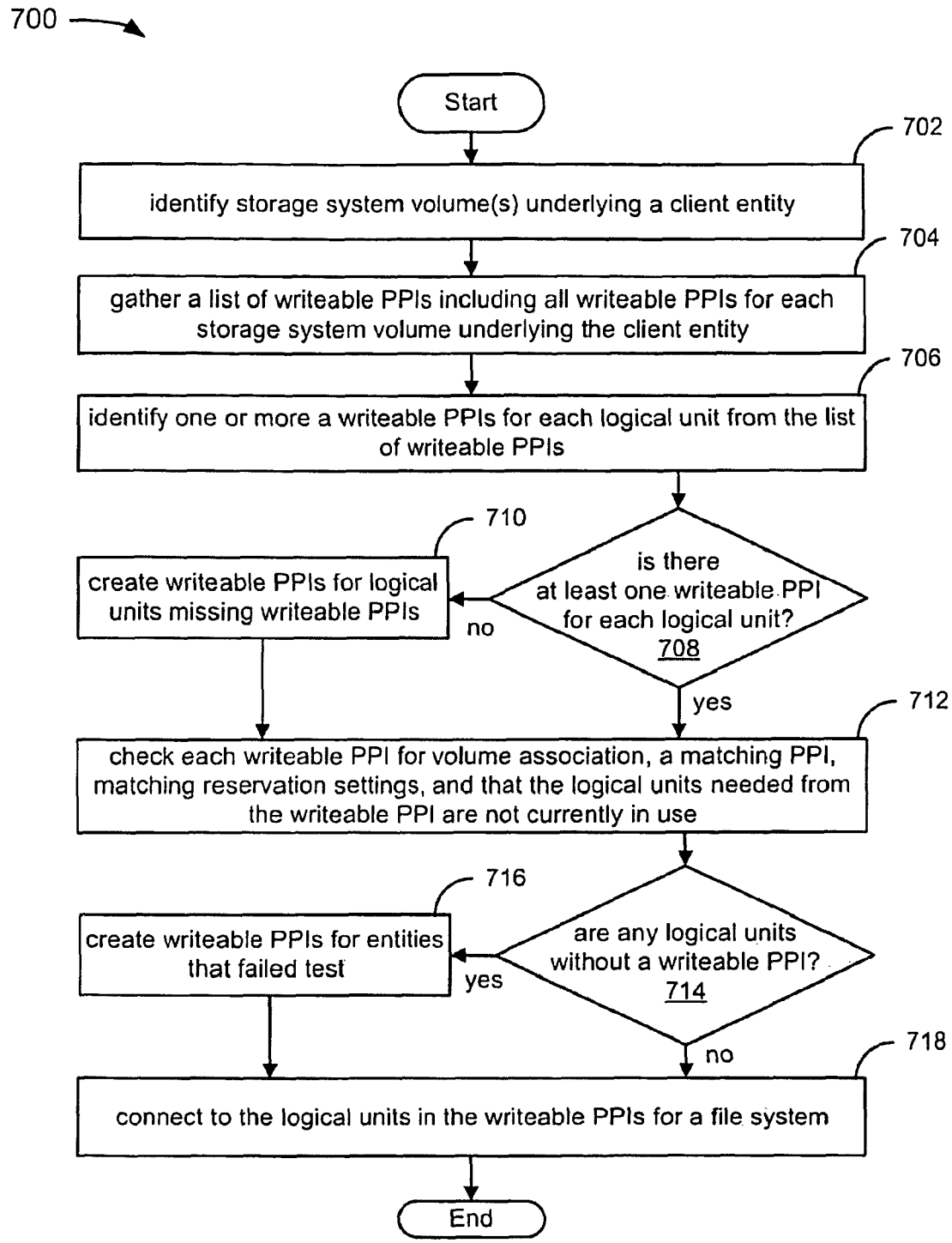
FIG. 7 is a flowchart of an alternative process for analyzing a writeable PPI for re-use.

FIG. 7 is a flowchart of an alternative process 700 for analyzing a writeable PPI for re-use. The flowchart of FIG. 7 provides a different view for subject matter discussed in reference to FIG. 6. An automated routine or a client triggers the process by indicating that a network storage controller should re-use a writeable PPI; for example, a client could transmit a request for a file system using a writeable PPI. Other modules discussed in FIG. 5 may be implicated for various functions as described below.

In the example of FIG. 7, the process begins at module 702 with identifying storage system volume(s) underlying a client entity. The client entity can be, for example, a file system, disk group, client volume, or other logical storage device. The client entity can be based on one or more logical units. A client file system translation engine 504, such as is discussed in reference to FIG. 5, can be used in modules 702, 704, and 706 to identify the storage system volume(s) underlying the clients.

In the example of FIG. 7, the process continues to module 704 with gathering a list of writeable PPIs including all writeable PPIs for each storage system volume underlying the client entity. A volume can have more than one existing PPI and a client file system translation engine, such as a client file system translation engine 504 as discussed in reference to FIG. 5, can perform the translation to identify the writeable PPIs. The list can include the one or more writeable PPIs associated with the volumes. The list can include potential candidates for re-use of writeable PPIs.

In the example of FIG. 7, the process continues to module 706 with identifying one or more writeable PPIs for each logical unit from the list of writeable PPIs. The logical unit can include an identifier of the writeable PPI or volume in which it resides. The identifier can be retrieved and used to identify the writeable PPI able to supply the logical unit. The writeable PPIs can be tested to identify a writeable PPI for re-use, if any is available.

In the example of FIG. 7, the process continues to decision module 708 with deciding: is there at least one writeable PPI for each logical unit? A writeable PPI may not exist for each logical unit needed for the file system. As such there does not have to be a PPI for each volume underlying the logical units. This determination is made based on whether or not any such writeable PPI(s) are unaccounted for.

In the example of FIG. 7, if the decision at module 708 is no, then the process continues to module 710 with creating writeable PPIs for logical units missing writeable PPIs. A writeable PPI creation module 510 such as is discussed in reference to FIG. 5, can be used. The writeable PPI creation module 510 can create a writeable PPI to supply the included logical unit.

In the example of FIG. 7 from module 710 or alternatively, if the decision at module 708 is yes, the process continues to module 712 with checking each writeable PPI for volume association, a matching PPI, matching reservation settings, an indication that the writeable PPI is not currently in use, and that the logical units were not modified after the creation of the writeable PPI. Should a writeable PPI fail the tests the writeable PPI may not be re-used.

In the example of FIG. 7, the process continues to decision module 714 with deciding: are any logical units without a writeable PPI? If any logical unit(s) lack a writeable PPI then the writeable PPI is still needed for the remaining logical unit(s). If the decision at module 714 is yes, then the flow chart proceeds to module 716 with creating writeable PPIs for entities that failed the test. A writeable PPI creation module 510 as discussed in reference to FIG. 5 can be used to create the writeable PPIs.

In the example of FIG. 7, from module 716 or if the decision at module 714 is no then the process proceeds to module 718 with connecting to the logical units in the writeable PPIs to create a file system. A file system construction module 502, such as one discussed in reference to FIG. 5 can be used to create the file system. Having connected to the logical units to create a file system, the process terminates.

Figure 8:
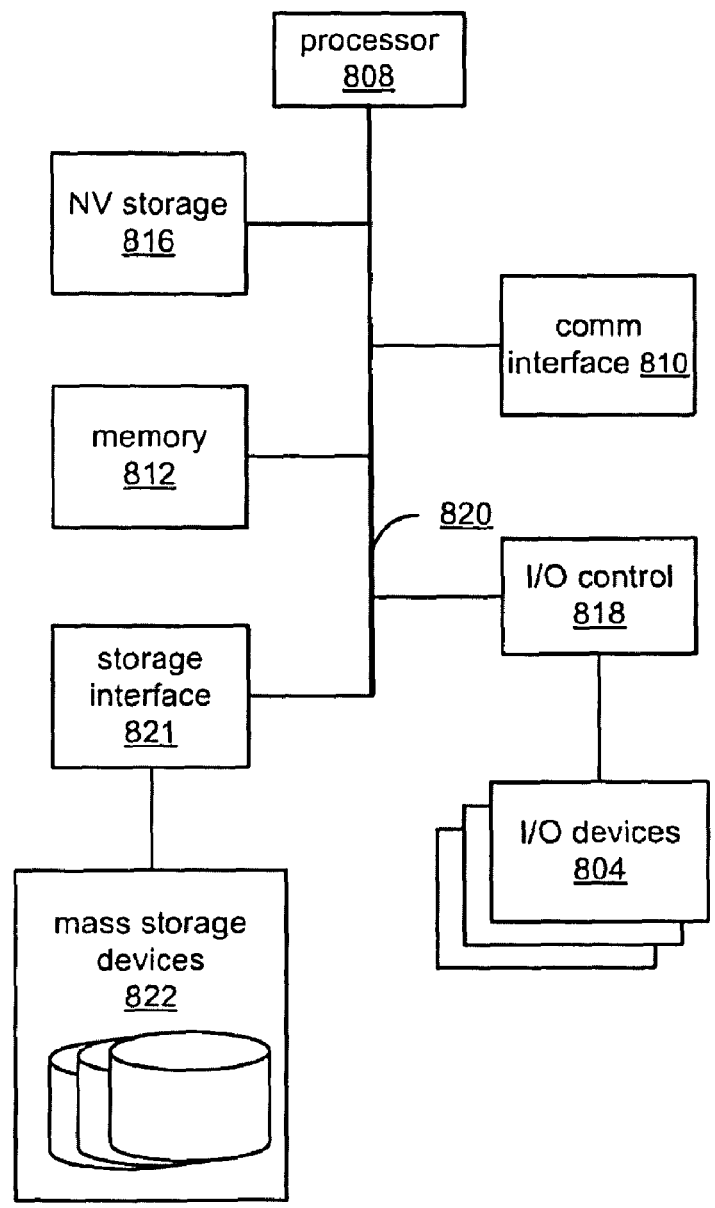
FIG. 8 is a high-level block diagram showing an example of the architecture of a processing system that can be representative of any of the processing systems discussed herein, such as a client or network storage controller.

FIG. 8 is a high-level block diagram showing an example of the architecture of a processing system that can be representative of any of the processing systems discussed herein, such as a client or network storage controller. The system 800 may be a conventional computing system, such as a personal computing system, hand held device, workstation, or server-class computing system. The system 800 includes I/O devices 804, processor 808, storage interface 821, a communications interface 88, memory 812, non-volatile storage 816, I/O controller 818.

The communications interface 810 may include a modem or network interface. The communications interface 810 can be an ethernet adapter, a Fibre Channel (FC) adapter, an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 808 may be, for example, a conventional programmable microprocessor such as an Intel Pentium microprocessor or Motorola power PC microprocessor. The memory 812 is coupled to the processor 808 by a bus 820. The memory 812 can be Dynamic Random Access Memory (DRAM) and can also include Static RAM (SRAM). The bus 820 couples the processor 808 to the communications interface 810, to the memory 812, also to the non-volatile (NV) storage 816, to the I/O controller 818, and to the mass storage interface 821.

At least in the case of a client, the I/O devices 804 can include a keyboard, disk drives, printers, a scanner, and other input and output devices, including a mouse or other pointing device.

The non-volatile storage 816 can be or include a magnetic hard disk, flash memory, an optical disk, or another form of persistent storage for large amounts of data. Some of this data is often written, by a direct memory access process, into memory 812 during execution of software. One of skill in the art will immediately recognize that the terms "machine-readable medium" or "computer-readable medium" includes any type of information storage device that is accessible by the processor 808.

At least in the case of a storage server, the storage interface 821 includes input/output (I/O) interface circuitry that couples the storage interface 821 to mass storage devices disks over an I/O interconnect arrangement, such as a conventional high-performance, FC (Fibre Channel) serial link topology. Information may be stored on any type of attached array of writable storage device media such as video tape, optical, DVD, magnetic tape, bubble memory, electronic random access memory, micro-electro mechanical, flash memory, and any other similar media adapted to store information, including data and parity information. The mass storage devices 822 are often magnetic hard disks, optical disks, or another form of storage for large amounts of data.

The system 800 is one example of many possible computing systems which have different architectures. For example, personal computers (PCs) based on an Intel microprocessor often have multiple buses, one of which can be an I/O bus for the peripherals and one that directly connects the processor 808 and the memory 812 (often referred to as a memory bus). The buses are connected together through bridge components that perform any necessary translation due to differing bus protocols.

Network computing devices are another type of computing system that can be used in conjunction with the teachings provided herein. Network computing devices do not usually include a hard disk or other mass storage, and the executable programs are loaded from a network connection into the memory 812 for execution by the processor 808. A typical computing system will usually include at least a processor, memory, and a bus coupling the memory to the processor.

Software or firmware embodying the techniques introduced above can be stored in memory 812, NV storage 816, and/or mass storage devices 822. The software and firmware can also be included on one or more external systems coupled to the processing system 800 by the communication interface 810, and/or an I/O device included in the I/O devices 804.

In addition, the system 800 is controlled by operating system software which includes a writeable PPI manager, such as a part of the operating system software (these components are not shown in FIG. 8). One example of operating system software with its associated writeable PPI manager is the family of operating systems known as Data OnTap® from NetApp, Inc. of Sunnyvale, Calif., with its associated WAFL (write anywhere file layout) file system. The writeable PPI manager is typically stored in the non-volatile storage 816 and causes the processor 808 to execute the various acts required by the operating system to input and output data and to store data in memory, including handling re-use of writeable PPIs on the non-volatile storage 816.

The techniques discussed above allow re-use of logical units of a writeable PPI. Accordingly, a writeable PPI manager can make use of existing writeable PPIs to offer logical units to clients without creating additional writeable PPIs. The writeable PPI manager can determine which writeable PPIs to re-use by testing the writeable PPIs for a variety of conditions.

What is claimed is:

1. A method comprising:
   receiving a request to create a writable PPI at a storage system;
   in response to the request to create a writable PPI, at the storage system making a decision that results in only a single outcome, wherein the single outcome is one of a plurality of specified possible outcomes of the decision, wherein a first one of the specified possible outcomes of the decision is to create a new writable PPI to service the request, and a second one of the specified possible outcomes of the decision is to re-use an existing writable PPI managed by the storage system, to service the request; and
   servicing the request at the storage system by re-using the existing writable PPI in response to the decision having the second one of the specified possible outcomes.

2. The method of claim 1 further comprising causing the storage system to translate a request for a file system to identify the existing volume and the existing writeable PPI.

3. The method of claim 1, wherein determining whether the existing writeable PPI is suitable for re-use includes inspecting the existing writeable PPI to detect use of the logical unit and use of the logical unit precludes the re-use of the existing writeable PPI.

4. The method of claim 1, wherein determining whether the existing writeable PPI is suitable for re-use includes inspecting the existing writeable PPI for reservation settings sufficient for data storage by a client requesting to create the writeable PPI.

5. The method of claim 1, wherein determining whether the existing writeable PPI is suitable for re-use includes verifying that the existing volume includes a client file specification indicating that the existing writeable PPI is derived from the volume.

6. A system comprising:
   a processor;
   a client file system translation engine operable to identify one or more volumes associated with a file system, the one or more volumes including one or more logical units;
   a writeable PPI re-use optimizer coupled to the client file system translation engine operable to make a decision that results in only a single outcome in response to a request to create a new writable PPI, wherein the single outcome is one of a plurality of specified possible outcomes of the decision, wherein one of the specified possible outcomes of the decision is to create a new writable PPI to service the request, and another one of the specified possible outcomes of the decision is to re-use an existing writable PPI managed by the system to service the request;
   a file system construction module coupled to the writeable PPI re-use optimizer operable to create a file system using the existing writeable PPI in response to the request; and
   a client mapping module coupled to the writeable PPI re-use optimizer directing a client to access the existing writeable PPI using the file system in response to the request.

7. The system of claim 6 further comprising a writeable PPI creation module operable to duplicate a logical unit.

8. The system of claim 6 further comprising a file system deletion module operable to remove a file system from a client.

9. The system of claim 6 further comprising a writeable PPI deletion module operable to recover storage resources from the existing writeable PPI.

10. The system of claim 6 further comprising a client un-mapping module operable to disconnect a client from a file system defined using the existing writeable PPI.

11. The system of claim 6 further comprising a client interface module operable to receive a request from a client for the existing writeable PPI.

12. A method comprising:
    receiving a request from a client to access an existing volume managed by a storage system;
    in response to the request, making a decision that results in only a single outcome, wherein the single outcome is one of a plurality of specified possible outcomes of the decision, wherein a first one of the specified possible outcomes of the decision is to create a new writable PPI to service the request, and a second one of the specified possible outcomes of the decision is to re-use an existing writable PPI managed by the storage system, to service the request, wherein said making a decision includes determining that the existing writeable PPI is derived directly or indirectly from the existing volume, that reservation settings of the existing writeable PPI match reservation settings desired by the client, and that a logical unit within the writeable PPI is not in use; and
    re-using the writeable PPI for the logical unit to create a file system for the client in response to the decision having the second one of the specified possible, outcomes.

13. The method of claim 12 wherein at least a portion of an existing volume is used by a client with the appearance that the storage is local to the client.

14. The method of claim 12 wherein the client is operatively coupled to the existing volume via a SAN Fabric utilizing a protocol selected from iSCSI and FCP.

15. The method of claim 12 wherein making the decision comprises determining that the existing writeable PPI is suitable for re-use by determining that a parent volume of the existing writeable PPI sources the logical unit, the parent volume backed up in one or more PPIs of the parent volume, the existing writeable PPI derived from one of the PPIs.

16. The method of claim 12 wherein making the decision comprises determining that the existing writeable PPI is suitable for re-use by determining that a PPI from which the existing writeable PPI is derived matches a PPI requested by a client desiring to re-use the existing writeable PPI.

17. The method of claim 12 wherein making the decision comprises determining that the existing writeable PPI is suitable for re-use by verifying that reservation settings of the existing writeable PPI match reservation settings supplied by the client, the reservation settings indicating a total amount of storage reserved for the existing writeable PPI for storage of data.

18. The method of claim 12 wherein making the decision comprises determining that the existing writeable PPI is suitable for re-use by determining that the logical unit is not in use and the logical unit was not modified after the creation of the existing writeable PPI.

19. The method of claim 12 further comprising identifying a file system defined for a first logical unit and a second logical unit, wherein the first logical unit is included in a first writeable PPI and the second logical unit is included in the existing writeable PPI.

20. A storage system comprising:
a plurality of storage volumes including an existing volume; and
a writeable PPI re-use optimizer operable to act in response to receiving a request to create a writeable PPI including a logical unit of the existing volume, the writeable PPI re-use optimizer operable to make a decision that results in only a single outcome, wherein the single outcome is one of a plurality of specified possible outcomes of the decision, wherein a first one of the specified possible outcomes of the decision is to create a new writeable PPI to service the request, and a second one of the specified possible outcomes of the decision is to re-use an existing writeable PPI managed by the storage system, to service the request, the writeable PPI re-use optimizer operable to identify an existing writeable PPI managed by the storage system, and the writeable PPI re-use optimizer operable to re-use the existing writeable PPI for the logical unit instead of instructing the storage system to create a new writeable PPI for the existing volume when the decision has the second one of the possible outcomes.

21. The storage system of claim 20 further comprising a file system translation engine operable to identify the existing writeable PPI as including a logical unit needed by a client.

22. The storage system of claim 20 further comprising a file system creation module operable to use the logical unit to support a file system managing data on behalf of a client.

23. The storage system of claim 20 wherein the writeable PPI re-use optimizer tests the existing writeable PPI to ensure that the existing writeable PPI matches a required volume, has sufficient reservation settings, and that the logical unit is not already in use.

24. A method comprising:
in response to receiving a request for a file system, identifying a plurality of existing writeable PPIs having logical units necessary to create the file system;
in response to the request, making a decision that results in only a single outcome, wherein the single outcome is one of a plurality of specified possible outcomes of the decision, wherein a first one of the specified possible outcomes of the decision includes creating a new writeable PPI to service the request, and a second one of the specified possible outcomes of the decision includes re-using at least one of the existing writable PPIs to service the request, and wherein making the decision includes testing the existing writeable PPIs to identify sufficient existing writeable PPIs to supply logical units necessary to implement the file system across the multiple logical units; and
re-using the writeable PPIs for the file system in response to the request, without creating a new writeable PPI.

25. The method of claim 24 wherein testing includes verifying that each existing writeable PPI is derived from a parent volume of each writeable PPI.

26. The method of claim 24 wherein testing includes verifying that reservation settings for each existing writeable PPI offer sufficient data storage for the needs of the client.

27. The method of claim 24 wherein testing includes checking each logical unit needed for the file system for current use and rejecting an existing writeable PPI where a necessary logical unit is already in use.

* * * * *